June 14, 1960  J. E. CHAMBERS  2,940,440
OVEN

Filed Nov. 3, 1950  2 Sheets-Sheet 1

Inventor,
John E. Chambers
By Schneider & Dressler, Attys

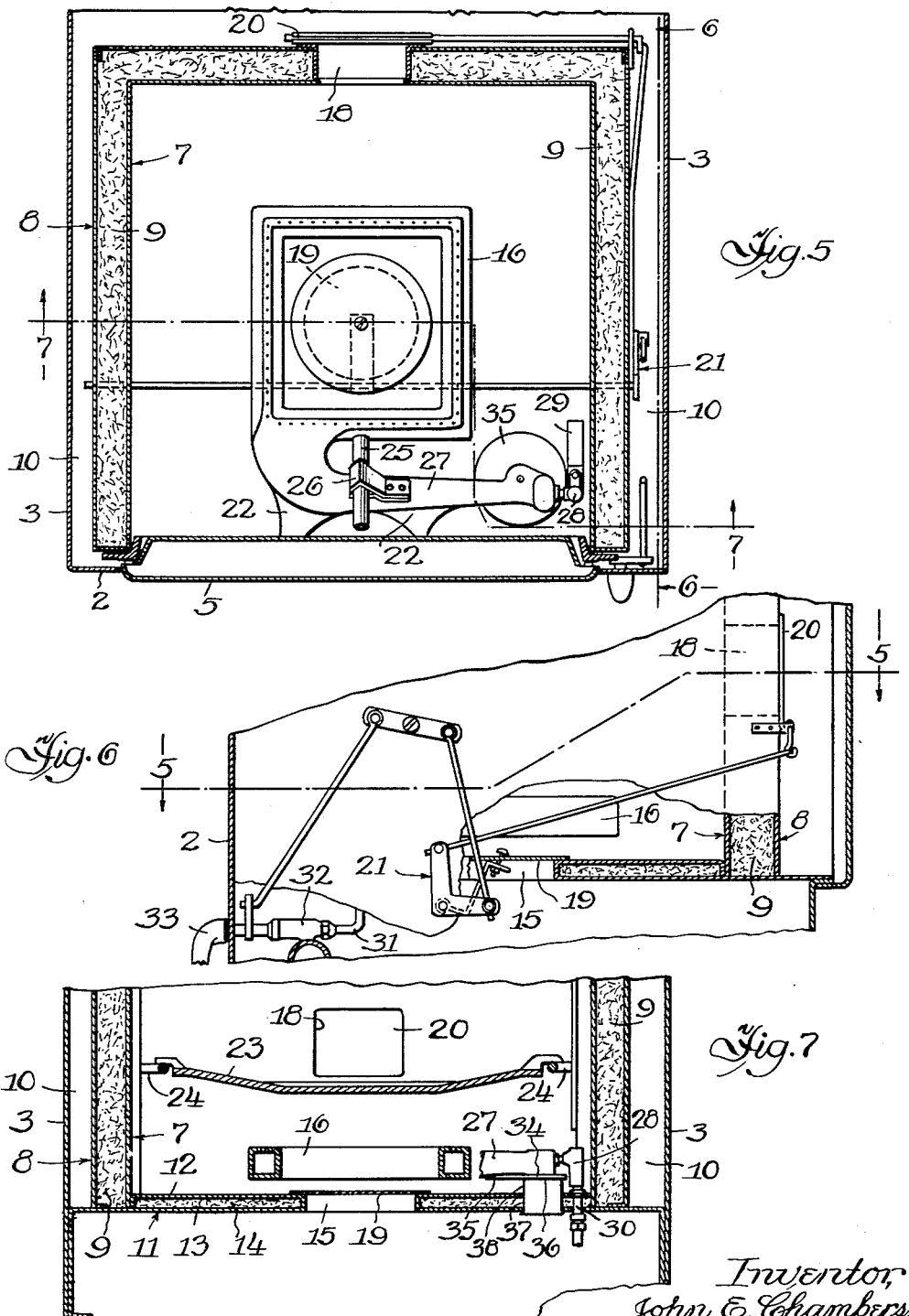

United States Patent Office 2,940,440
Patented June 14, 1960

2,940,440

OVEN

John E. Chambers, Shelbyville, Ind., assignor to Chambers Corporation, a corporation of Indiana Filed Nov. 3, 1950, Ser. No. 193,978

7 Claims. (Cl. 126—39)

This invention relates to an oven, and is particularly concerned with an oven having a complete gas burner assembly within the oven and having means for supplying the primary air for the burner from outside the cooking cavity of the oven.

The oven of the present invention is primarily designed for incorporation into cabinet groupings such as those presently being installed in modern kitchens. It is built to standard dimensions generally followed in such installations and is adapted to be positioned on top of a utility cabinet so as to place it at a convenient working height instead of under the cooking top of a stove. This arrangement eliminates the excessive bending or stooping necessary on the part of a housewife using an oven positioned under the cooking top of a conventional cooking stove or range.

Up to the time of the present invention, in so far as I am aware, it was not considered possible to position a gas oven on top of a cabinet and to fit it in with a grouping of conventional cabinets in a standardized kitchen assembly because in such installations the width of each cabinet has been standardized at twenty four inches. This width is not sufficient to allow the mixer pin to project outwardly from the cooking cavity of the oven and still be enclosed in an oven cabinet of dimensions conforming to the conventional cabinet size of standardized kitchen installations. It has always been considered necessary to have the mixer pin extend through the oven wall to the ambient atmosphere to provide an avenue for primary air to the burner. It was thought that if the oven were positioned on top of a conventional cabinet, the top of the lower cabinet would close the bottom of the oven so that no air would be available to the burner through that avenue.

The oven constructed in accordance with the present invention is a compact unit, of the same size as other standardized cabinets in kitchen assemblies, and is made possible by placing the complete burner assembly, including the mixer pin, within the cooking cavity of the oven. The appearance of the oven conforms to the appearance of the other cabinets in such kitchen assemblies, and does not detract from the neat, attractive appearance of the kitchen in which it is installed. In order to achieve the desired result it is necessary to provide means in communication with the ambient air through which primary air is supplied to the burner even when the oven is positioned on a cabinet which completely closes the bottom of the oven unit.

The structure by which the above and other advantages of the invention are attained will be described in the following specification, taken in conjunction with the accompanying drawings, illustrating a preferred structural embodiment of the invention, in which:

Fig. 5 is a cross sectional view, taken generally along the line 5—5 of Fig. 6, and showing the burner and the burner assembly within the cooking cavity of the oven;

Fig. 6 is a fragmentary cross sectional view, taken along the line 6—6 of Fig. 5, and showing the damper control mechanism; and Fig. 7 is a cross sectional view, taken along the line 7—7 of Fig. 5, but with the damper control mechanism omitted for clarity of illustration.

Figure 1:
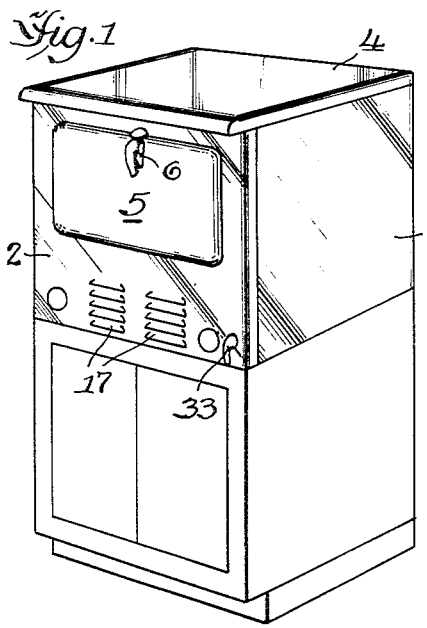
Figure 1 is a perspective view showing an oven embodying the invention and mounted on a conventional cabinet of the type used in modern kitchen installations.
Figure 2:
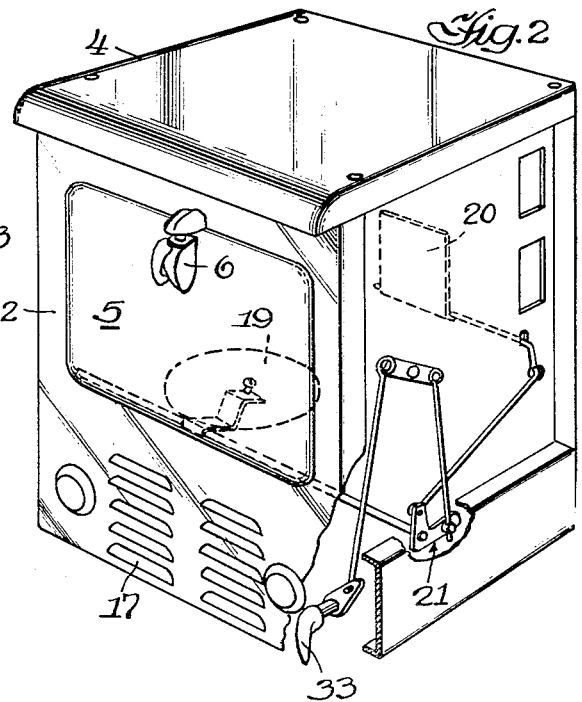
Fig. 2 is a perspective view of an oven with parts broken away to illustrate the damper control mechanism used to control the flue opening through which secondary air necessary to support combustion enters the oven cavity and the flue opening through which the products of combustion leave the oven cavity.

Referring to the drawings, the oven comprises a front wall 2, outer side and back panels 3, a top panel 4, and a door 5. The door is conventional and is held closed by a conventional latch 6. Positioned within the space defined by front wall 2 and outer panels 3 are an inner hull 7 and an outer hull 8. These hulls are spaced from each other, and a layer of insulation 9 of any suitable material, such as glass wool or asbestos, for example, is positioned therebetween. A suitable air space 10 is provided between outer hull 8 and outer panels 3 to provide passageways for cool air in accordance with the invention of Thomas Esta Phares disclosed in the application filed in his name on October 14, 1950, under Serial No. 190,071, now Patent No. 2,839,044.

The insulated walls defined by hulls 7 and 8 and the inner wall of door 5 circumscribe the sides of the cooking cavity. The bottom 11 of the cooking cavity comprises a pair of spaced plates 12 and 13 with a layer of suitable insulation material 14 positioned therebetween. Bottom 11 is provided with a flue opening 15 through which the secondary air necessary to support combustion of burner 16 flows. This secondary air, as well as the primary air for the burner, is admitted into the oven through louvers 17 provided in front wall 2. Louvers 17 are located at a level below bottom 11 of the cooking cavity. A flue opening 18 is provided through the rear walls of hulls 7 and 8 to permit the escape of the hot exhaust gases from the oven.

Both flue openings 15 and 18 are provided with dampers 19 and 20, respectively, which are controlled by a mechanism indicated generally by the reference numeral 21, which is operable to open both dampers simultaneously when the gas is turned on and to close them when the gas is turned off. This damper control mechanism does not constitute part of the present invention and will not be described in detail inasmuch as it is fully disclosed and described in the above mentioned application of Thomas Esta Phares.

Burner 16 is contained entirely within the cooking cavity of the oven and is supported on bottom 11 by a plurality of feet 22. An oven baffle plate 23 is supported in the cooking cavity directly above burner 16 by means of a plurality of ears 24 projecting inwardly from the walls of the cooking cavity. An igniter tube 25 is held in position to ignite the gas-air mixture issuing from the burner, by means of a clamp 26 secured to the neck 27 of the burner. A mixer pin 28 projects into the end of neck 27 to supply gas to the burner. The mixer pin is positioned entirely within the cooking cavity and is secured to the oven bottom by means of a strap 29 provided for the purpose. Mixer pin 28 has a fitting 30 extending through bottom 11 to connect it to a pipe 31 leading to gas valve 32 which is connected to the gas manifold. A handle 33 positioned outside front wall 2 controls valve 32 to furnish gas through pipe 31.

Figure 3:
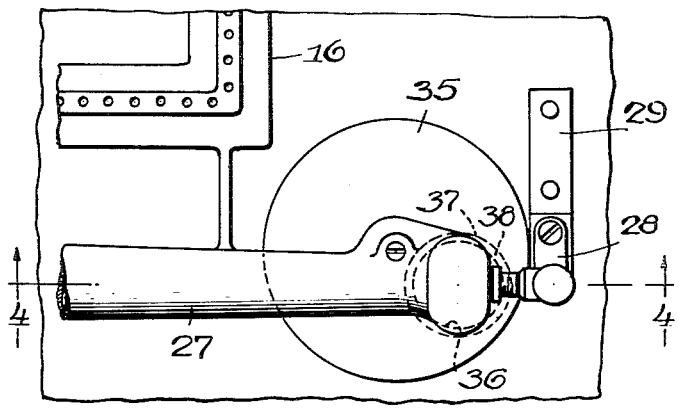
Fig. 3 is a fragmentary top plan view of the burner assembly.
Figure 4:
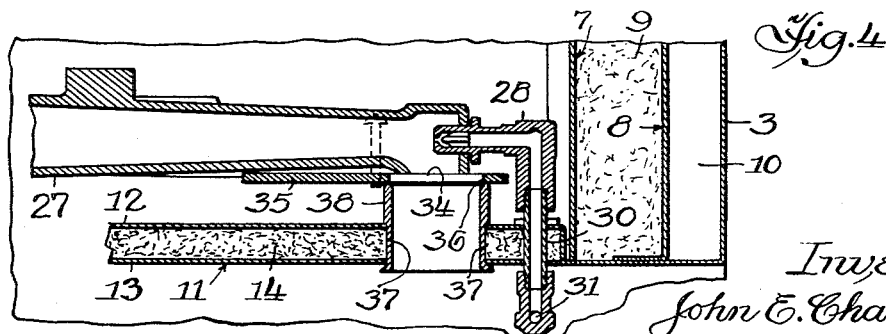
Fig. 4 is a cross sectional view, taken substantially along the line 4—4 of Fig. 3, and showing the burner assembly in its position within the cooking cavity of the oven.

Neck 27 of burner 16 has a downwardly facing opening 34 positioned adjacent the end through which mixer pin 28 projects. A shutter 35 is pivoted to the underside of neck 27 so as to swing in the plane of opening 34. The shutter has a large aperture 36 (shown in Figs. 3 and 4) positioned between its axis of rotation and periphery so that as the shutter is swung about its pivot the aperture may be moved progressively between a position in which it is completely aligned with opening 34 to a position in which it is completely out of alignment with opening 34. In this latter position shutter 35 substantially covers opening 34 and practically seals it against the entrance of air. The amount of primary air flowing into burner 16 is controlled by the position of shutter 35. Pivotal movement of almost 360° is required to move shutter 35 from fully open to fully closed position. Bottom 11 is provided with an opening 37 in alignment with opening 34. A sleeve 38 positioned in opening 37 extends upwardly into substantial contact with shutter 35 to prevent air from leaking between shutter 35 and sleeve 38 into the cooking cavity.

It is important to prevent any substantial leakage of air between the upper edge of sleeve 38 and shutter 35 for two reasons. If this joint were not substantially air tight some gas might escape therethrough and cause a dangerous condition in the oven. The other reason, to insure that all the primary air for the burner flows directly to the burner through sleeve 38. If part of the primary air came through the joint between sleeve 38 and shutter 35 it would not be all pure air, but would include some exhaust gases caused by combustion of burner 16. This proportion of exhaust gases, even though small, would interfere with proper combustion of the burner.

Although I have described a preferred embodiment of the invention in considerable detail, it will be understood that the description thereof is intended to be illustrative, rather than restrictive, as many details may be modified or changed without departing from the spirit of scope of the invention. Accordingly, I do not desire to be restricted to the exact structure described.

I claim:

1. A gas oven having a bottom, a burner and a mixer pin positioned entirely within said oven above said bottom, said burner having an opening for admission of primary air, an apertured shutter fitting tightly against said burner opening to provide a substantially air-tight joint therebetween, said bottom having an opening extending therethrough for admission of secondary air to said burner, said bottom having a separate opening extending therethrough adjacent said mixer pin for the flow of primary air to said burner, and a sleeve extending through said last mentioned opening, said sleeve fitting tightly against the underside of said shutter to substantially seal the opening in said burner against admission of air except through said sleeve.

2. A gas oven having a bottom, a burner positioned entirely within said oven, said bottom having two separate openings, one of said openings being effective to admit secondary air into said oven to support combustion of said burner, said burner having an opening positioned above said other opening in said oven bottom, and a sleeve positioned in said other bottom opening, said sleeve communicating directly with the opening in said burner to furnish primary air to said burner.

3. A gas oven having a bottom, a burner positioned entirely within said oven, said bottom having two separate openings, one of said openings being effective to admit secondary air into said oven to support combustion of said burner, said burner having an opening positioned above said other opening in said oven bottom, a sleeve positioned in said other bottom opening, said sleeve communicating directly with the opening in said burner to furnish primary air to said burner, and means positioned within said oven controlling the flow of primary air to said burner.

4. A gas oven having a bottom provided with two separate openings therein, a burner positioned entirely within said oven, one of said openings being effective to admit secondary air into said oven to support combustion of said burner, said burner being provided with an opening for the admission of primary air thereto, an apertured shutter in engagement with said burner opening, and a sleeve in said other bottom opening to direct primary air into said burner, the upper edge of said sleeve being in engagement with the lower surface of said shutter to substantially seal said burner opening against admission of air except that flowing through said sleeve.

5. A gas oven having a bottom provided with two separate openings therein, a burner and a mixer pin positioned entirely within said oven, one of said openings being effective to admit secondary air into said oven to support combustion of said burner, said burner being provided with an opening for the admission of primary air thereto, an apertured shutter in engagement with said burner opening, and a sleeve in said other bottom opening to direct primary air into said burner, the upper edge of said sleeve being in engagement with the lower surface of said shutter to substantially seal said burner opening against admission of air except that flowing through said sleeve.

6. A gas oven comprising a front wall and a bottom, a plurality of louvers in said front wall below the level of said bottom to admit air below said bottom, a burner positioned in said oven above said bottom, said burner having an opening, said bottom having an opening through which some of said air may flow into said oven to support combustion of said burner, said bottom having a second opening through which some of said air may flow, a sleeve extending from said second bottom opening to said burner opening to direct said last mentioned air into said burner, and an apertured shutter, the upper surface of said shutter being in engagement with said burner opening and the lower surface of said shutter being in engagement with the upper edge of said sleeve, whereby said burner opening is substantially sealed against admission of air except through said sleeve.

7. A gas oven comprising a front wall and a bottom, a plurality of louvers in said front wall below the level of said bottom to admit air below said bottom, a burner and a mixer pin positioned entirely within said oven above said bottom, said burner having an opening, said bottom having an opening through which some of said air may flow into said oven to support combustion of said burner, said bottom having a second opening through which some of said air may flow, a sleeve extending from said second bottom opening to said burner opening to direct said last mentioned air into said burner, and an apertured shutter, the upper surface of said shutter being in engagement with said burner opening and the lower surface of said shutter being in engagement with the upper edge of said sleeve, whereby said burner opening is substantially sealed against admission of air except through said sleeve.

References Cited in the file of this patent

UNITED STATES PATENTS

| | | |
|---|---|---|
| 481,604 | Wagner | Aug. 30, 1892 |
| 516,107 | Pemberton | Mar. 6, 1894 |
| 1,123,318 | Kuekes | Jan. 5, 1915 |
| 1,140,154 | Hawley | May 18, 1915 |
| 1,652,533 | Keith | Dec. 13, 1927 |
| 1,700,938 | Kosmopulos et al. | Feb. 5, 1929 |
| 1,942,265 | Teller et al. | Jan. 2, 1934 |
| 2,057,373 | Dukes | Oct. 13, 1936 |
| 2,122,093 | Frick | June 28, 1938 |
| 2,156,516 | Schnieder | May 2, 1939 |
| 2,174,274 | Parsons | Sept. 26, 1939 |
| 2,337,301 | Phares | Dec. 21, 1943 |